United States Patent
Chu et al.

(10) Patent No.: US 8,249,033 B2
(45) Date of Patent: *Aug. 21, 2012

(54) COMMUNICATION BETWEEN OVERLAPPING WRAN CELLS WORKING IN DIFFERENT CHANNELS

(75) Inventors: Liwen Chu, San Jose, CA (US); Wendong Hu, San Jose, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,127

(22) Filed: Jun. 30, 2011

(65) Prior Publication Data

US 2011/0255520 A1 Oct. 20, 2011

Related U.S. Application Data

(63) Continuation of application No. 12/035,374, filed on Feb. 21, 2008, now Pat. No. 8,031,681.

(60) Provisional application No. 60/891,122, filed on Feb. 22, 2007.

(51) Int. Cl.
*H04J 3/00* (2006.01)
*H04W 72/00* (2009.01)

(52) U.S. Cl. ..................................... 370/336; 455/452.1

(58) Field of Classification Search .................. 370/336, 370/329; 455/450, 451, 452.1, 452.2, 453
See application file for complete search history.

(56) References Cited

U.S. PATENT DOCUMENTS

| | | | |
|---|---|---|---|
| 5,625,626 A | 4/1997 | Umekita |
| 5,805,633 A | 9/1998 | Uddenfeldt |
| 5,862,142 A | 1/1999 | Takiyasu et al. |
| 6,275,518 B1 | 8/2001 | Takahashi et al. |
| 6,496,498 B1 | 12/2002 | Kockmann et al. |
| 6,744,743 B2 | 6/2004 | Walton et al. |
| 6,763,230 B2 | 7/2004 | Cheng |
| 6,888,819 B1 | 5/2005 | Mushkin et al. |
| 7,002,927 B2 | 2/2006 | Guruprasad |
| 7,024,165 B2 | 4/2006 | Stepp et al. |
| 7,171,160 B2 | 1/2007 | Chuah et al. |
| 7,280,836 B2 | 10/2007 | Fuccello et al. |

(Continued)

OTHER PUBLICATIONS 802.11 Working Group of the LAN/MAN Committee; Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking; Draft document; IEEE P802.11s/D0.03, Aug. 2006, 192 pps, New York, New York.

(Continued)

*Primary Examiner* — Christopher M Brandt
(74) *Attorney, Agent, or Firm* — Hogan Lovells US LLP (57) ABSTRACT

A common control channel for base station ("BS")/consumer premise equipment ("CPE") communication in areas of overlapping coverage by wireless regional area network ("WRAN") cells operating on different working channels is disclosed. A common control channel is selected from among the various working channels sensed in each of a plurality of overlapping WRAN cells so as to enable BS/CPE and BS/BS communication. Once chosen, each CPE within the overlapping area communicates with the controlling BS via an enhanced coexistence beacon protocol messages. These messages include timing and other synchronization information.

28 Claims, 3 Drawing Sheets

U.S. PATENT DOCUMENTS

| | | | |
|---|---|---|---|
| 7,508,781 | B2 | 3/2009 | Liu et al. |
| 7,609,641 | B2 | 10/2009 | Strutt et al. |
| 7,701,910 | B2 | 4/2010 | Yoon et al. |
| 7,710,919 | B2 | 5/2010 | Woo et al. |
| 7,729,696 | B2 | 6/2010 | Harris et al. |
| 7,813,326 | B1 | 10/2010 | Kelm et al. |
| 7,948,930 | B2 | 5/2011 | Rhee |
| 7,983,703 | B2 | 7/2011 | Chu |
| 2002/0009067 | A1 | 1/2002 | Sachs et al. |
| 2002/0052206 | A1 | 5/2002 | Longoni |
| 2002/0062388 | A1 | 5/2002 | Ogier et al. |
| 2003/0013451 | A1 | 1/2003 | Walton |
| 2003/0033394 | A1 | 2/2003 | Stine |
| 2003/0117966 | A1 | 6/2003 | Chen |
| 2004/0072565 | A1 | 4/2004 | Nobukiyo et al. |
| 2004/0142699 | A1 | 7/2004 | Jollota et al. |
| 2004/0266351 | A1 | 12/2004 | Chuah et al. |
| 2004/0266376 | A1 | 12/2004 | Cowley et al. |
| 2005/0157676 | A1 | 7/2005 | Kwak et al. |
| 2005/0226201 | A1 | 10/2005 | McMillin |
| 2005/0239497 | A1* | 10/2005 | Bahl et al. .................. 455/552.1 |
| 2005/0245199 | A1 | 11/2005 | Batra et al. |
| 2005/0265283 | A1 | 12/2005 | Qi et al. |
| 2006/0013177 | A1 | 1/2006 | Saito |
| 2006/0142021 | A1 | 6/2006 | Mueckenheim et al. |
| 2006/0199562 | A1 | 9/2006 | Taylor |
| 2007/0091998 | A1 | 4/2007 | Woo et al. |
| 2007/0111734 | A1 | 5/2007 | Beppu et al. |
| 2007/0117517 | A1 | 5/2007 | Hui et al. |
| 2007/0223419 | A1 | 9/2007 | Ji et al. |
| 2007/0243892 | A1 | 10/2007 | Mikami et al. |
| 2007/0248067 | A1 | 10/2007 | Banerjea et al. |
| 2008/0159258 | A1 | 7/2008 | Ji et al. |
| 2008/0165680 | A1 | 7/2008 | Chang |
| 2008/0205352 | A1 | 8/2008 | Chu et al. |
| 2009/0003291 | A1 | 1/2009 | Chu et al. |

OTHER PUBLICATIONS

Woo et al.; Systems, Methods, and Apparatuses for Spectrum-Sensing Cognitive Radios; U.S. Appl. No. 60/729,036; 43 pps.

IEEE Lan Man Standards Committee; Draft Amendment to IEEE Standard for Local and metropolitan area networks Part 16: Air Interface for Fixed and Mobile Broadband Wireless Access Systems Improved Coexistence Mechanisms for License-Exempt Operation; Draft document; IEEE P802.16h/D1, Oct. 2006; 201 pps; New York, New York.

Freedman, Avi; Slave Hierarchy for Better Usage of Regions not Interfered by the Master Subframe; Report; IEEE C802.16h-06/102; Broadband Wireless Access Working Group; Nov. 8, 2006; 6 pps.

Chang, Soo-Young; Analysis of Proposed Sensing Schemes; Report; IEEE P802.22 Wireless RANs; Slides; IEEE 802.22-06/0032r0; Mar. 6, 2006; 82 pps; Sacramento, CA Chang, Soo-Young and Zhang, Jianwei; Waveform Modulated Wran System; Slides; IEEE P802.22 Wireless RANs; IEEE 802.22-05/0107r3; Jan. 16, 2006; 83 pps; Sacramento, CA.

Chu, Liwen; Kyeongsoo, Kim; Kruys, Jan; Rahman, Shah; Vlantis, George; 6-Address Scheme for TGs Mesh; Slides; IEEE 802.11-06/841r5; Sep. 19, 2006; 20 pps; San Jose, CA.

Iwata, Atsushi; Chiang, Ching-Chuan; Pei, Guangyu; Gerla, Mario and Chen, Tsu-Wei; Report; Scalable Routing Strategies for Ad hoc Wireless Networks; Abstract; 26 pps; Los Angeles, CA.

Hong, Xiaoyan; Xu, Kaixin and Gerla, Mario; Scalable Routing Protocols for Mobile Ad Hoc Networks; Report; IEEE Network; Jul./Aug. 2002; 11 pps.; Los Angeles, CA.

Pei, Guangyu; Gerla, Mario and Chen, Tsu-Wei; Fisheye State Routing: A Routing Scheme for Ad Hoc Wireless Networks; Report; IEEE; 2000; 5 pps.

Yang, Chun-Chuan and Tseng, Li-Pin; Fisheye Zone Routing Protocol for Mobile Ad Hoc Networks; Report; IEEE; 2004; 6 pps; Taiwan R.O.C.

Chu, Liwen; Hu, Wendong; Vlantis, George; Gross, James; Abusubaih, Murad; Willkomm, Daniel and Wolisz, Adam; Dynamic Frequency Hopping Community IEEE P802.22 Wireless RANs; Slides; IEEE 802.22-06/0113r0; Jun. 29, 2006; 61 pps.

Chang, Soo-Young; Spectral Correlation Sensing for Detection of Incumbent User Signals for Wireless Rural Area Networks (WRANs) and Other Systems/Applications; U.S. Appl. No. 60/883,810; Report; 26 pps; CA.

* cited by examiner

COMMUNICATION BETWEEN OVERLAPPING WRAN CELLS WORKING IN DIFFERENT CHANNELS

RELATED APPLICATION

The present invention claims priority from, and is a continuation application of, U.S. patent application Ser. No. 12/035,374 filed Feb. 21, 2008, which claims the benefit of U.S. Provisional Patent Application No. 60/891,122 filed on Feb. 22, 2007, all of which are herein incorporated by reference as if set forth in their entireties.

BACKGROUND OF THE INVENTION

1. Field of the Invention

Embodiments of the present invention relate, in general, to systems and methods for communication among components within wireless regional area networks and particularly to the selection of common control channels among overlapping wireless regional area network cells.

2. Relevant Background

In a wireless network comprising multiple overlapping cells in which the cells are working on different channels, frames must be synchronized; this is called multiple-channel synchronization ("MCS"). In addition to frame synchronization, control information must also be transmitted among multiple overlapping cells. Dynamic Frequency Hopping ("DFH") is an example of MCS meaning it requires such frame synchronization and control information exchange. DFH incorporates non-traditional dynamic channel allocation with slow frequency hopping. One significant application of DFH is found in the operation of what is referred to in the art as a Wireless Regional Area Network ("WRAN").

A WRAN cell consists of a Base Station ("BS") and the associated customer Premise Equipments ("CPEs") that communicate to the BS via a fixed point-to-multi-point radio air interface (i.e. an antenna). Overlapping WRAN cells working on the same channel coordinate operations via coexistence beacon protocol ("CBP") messages. CBP is a best-effort protocol based on coexistence beacon transmissions to cope with self-interference issues and avoid interference with incumbent DFH community users. To operate, WRAN cells must satisfy two apparently conflicting requirements: (1) assure the Quality of Service ("QoS") satisfaction for WRAN services and (2) continue to provide reliable and timely frequency spectrum sensing. Current sensing requirements state that incumbent signals shall be detected by WRAN devices with no more than a 2 second delay. Thus, a WRAN cell must perform sensing on a working channel at least every 2 seconds. Since a channel that is to be sensed cannot be used for data transmission, a cell operating consistently on a single channel must interrupt data every 2 seconds for sensing. Such a non-hopping mode leads to periodic interruptions and can significantly decrease system throughput and impair QoS.

Generally, the key concept behind this intelligent type of frequency hopping is to adjust or create frequency hopping patterns based on interference measurements. DFH uses slow frequency hopping and adaptively modifies the utilized frequency hopping pattern based on rapid frequency quality measurements, sometimes referred to as QoS measurements. This technique combines traditional frequency hopping with dynamic channel allocation where a channel is one frequency in a frequency hop pattern. The continuous modification of frequency hop patterns is based on measurements representing an application of dynamic channel allocation to slow frequency hopping. Modifications are based on rapid interference measurements and calculations of the quality of frequencies used in a system by all CPEs and BSs. The target of these modifications is tracking the dynamic behavior of the channel quality as well as of interference.

DFH differs from conventional frequency hopping in the way the patterns are built. Instead of using random or predefined repetitive hopping patterns, DFH patterns are generated for active users on the fly. In this manner, the hopping patterns can be adjusted to adapt to interference changes. In DFH communication, components of a WRAN cell (the CPEs) hop over a set of channels. During operation on a working channel, sensing is performed in parallel on the intended next working channels. After 2 seconds, a channel switch takes place: one of the intended next working channels becomes the new working channel, and the channel previously used is vacated. Hence, an interruption is no longer required for sensing. Obviously, efficient frequency usage and mutual interference-free spectrum sensing can only be achieved if multiple neighboring overlapping WRAN cells operating in the DFH mode coordinate their hopping behavior. This coordination must include frame synchronization.

A DFH community is a non-empty set of neighboring WRAN cells following a common protocol that supports a coordinated DFH operation. This coordinated operation ensures mutual interference-free channel sensing and minimizes channel usage while applying DFH phase-shifting. A DFH community has one leader and, possibly, some community members. A DFH community also requires MCS if it is to exist among other DFH communities.

As previously discussed, CBP is a best-effort type of transmission that copes with self-interference issues among overlapping WRAN cells. The basic mechanism of CBP works as follows. BSs of neighboring cells schedule a coexistence window at the end of every Media Access Control ("MAC") frame (synchronized among BSs). During a coexistence window, neighboring BSs communicate using coexistence beacons. CBP was developed for constant channel assignment. Alternatively, in DFH community mode the channel assigned for transmission to individual cells varies with time.

Figure 1:
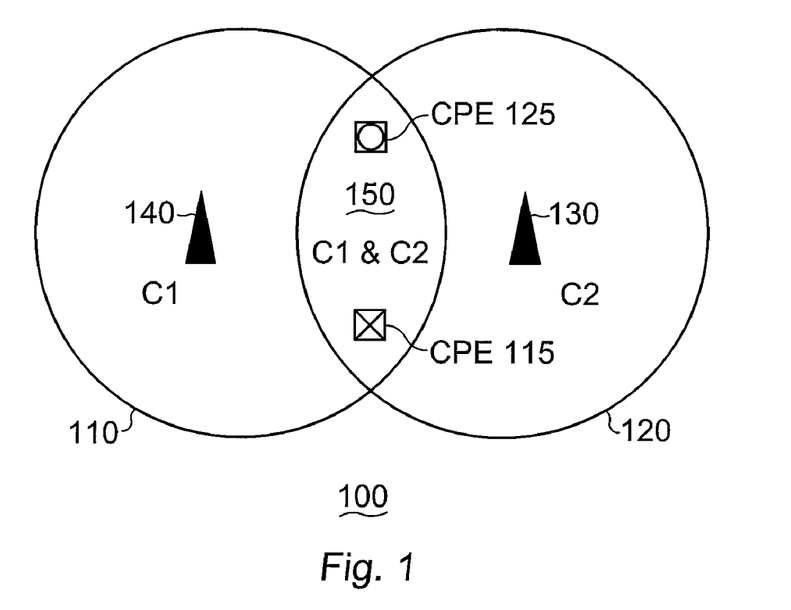
FIG. 1 shows a high level view of two overlapping WRAN cells that are operating on different working channels and which include two CPEs operating within the overlap area according to techniques known in the prior art.

FIG. 1 shows a high level view 100 of two overlapping WRAN cells 110, 120 operating on different working channels as is known in the prior art. Each WRAN cell 110, 120 includes a base station 140, 130 and operates on its own working channel. In this case the left most WRAN cell 110 operates on channel C1 and the right most WRAN cell 120 operates on channel C2. Within the overlap area 150 two CPEs 115, 125 exist. As is known in the prior art, each of these CPEs continues to operate on the working channel of the WRAN cell with which it is associated. In this example, the first CPE 115 operates on channel C1 while the second CPE 125 operates on channel C2. Within this overlap area 150 the CPEs are not synchronized thus presenting an opportunity for collisions and reduced performance. Furthermore, since the CPEs 115, 125 are operating on different working channels, they cannot communicate to one another to aid in coexistence using CBP despite their close proximity.

So while CBP works well with synchronization of overlapping WRAN cells operating on the same channel and can facilitate self coexistence among these overlapping cells, it cannot be used for multiple-channel synchronization. Frame synchronization among neighboring systems and control information exchange operating on different channels remains a challenge.

SUMMARY OF THE INVENTION

A common control channel for BS/CPE communication in areas of overlapping coverage by WRAN cells operating on different working channels is disclosed. According to the present invention, a common control channel is selected from among the various working channels associated with each of a plurality of overlapping WRAN cells to enable BS/CPE of different cells and BS/BS communication. Once chosen, BS and CPEs within the overlapping area already operating on the common control channel are said to own the common control channel. CPEs within the overlapping area communicate with each other on the common control channel BS via enhanced coexistence beacon protocol ("ECBP") messages. CPEs within overlapping area also communicate with the BS of the control channel owner on the common control channel BS via enhanced coexistence beacon protocol ("ECBP") messages. These messages include timing and other control information.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to one embodiment of the present invention, a method for communicating in overlap regions formed by a plurality of WRAN cells operating on different working channels is disclosed. A communication between a CPE and a BS of one WRAN in which the CPE is operating within an overlap area is conducted using an ECBP message. A communication among CPEs within an overlap area is conducted using an ECBP message including communication among CPEs and the BS of the common control channel owner. The ECBP message includes packets of information not normally found on a CBP message. These packets include the designation of a common control channel and synchronization information.

The establishment of an ECBP communication between a CPE and BS on the cell's working channel also enables the CPE to sense other channels that are being used by neighboring cells. Once sensed, the CPE sends a message to its BS about the channels used by neighboring WRAN cells. This information is maintained by each BS and used to determine a common control channel for use in the areas in which coverage areas overlap. Once a common control channel is selected, CPEs within the overlapping area are directed by ECBP packets. These packets can be used to synchronize frames and control other operations of the overlapping cells.

According to another version of the present invention, a system for common control of CPEs in overlapping areas of a plurality of WRAN cells is discussed. Each of a plurality of WRAN cells operates on a working channel. As these cells overlap, the CPEs operating in the overlap area are subject to communication and control by two differing BSs. In the past CBP messages have been used to coordinate CPEs operating in such areas when the overlapping cells operate on the same working channel. However, with the cells operating on different working channels, such coordination is not possible. According to one embodiment of the present invention, a CPE operating within an overlap area senses other channels on which neighboring cells are operating. This information is conveyed to the BS associated with the CPE which then uses that information to select a common control channel for that particular overlap area.

The selection of the common control frequency is conveyed to the CPEs operating within that particular overlap area via ECBP packets. Should the new common control channel be larger in frequency than one identified by another CPE within the overlap area, the assignment and selection of the common control channel is adjusted so as to arrive at the smallest common control channel for all CPEs operating within a specific overlap area.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A common control channel for CPE/BS communication within regions of overlapping coverage formed by a plurality of WRAN cells is herein disclosed. A plurality of WRAN cells working on different working channels create several overlap regions or areas. Within each of these areas several working channels may be operating to direct and communicate with the CPEs. According to one embodiment of the present invention, a common control channel for each overlap area is selected. Once chosen the common control channel is used to direct and communicate with each CPE within a particular overlap area so as to synchronize frames and convey timing information and other data so as to enhance wireless communication.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
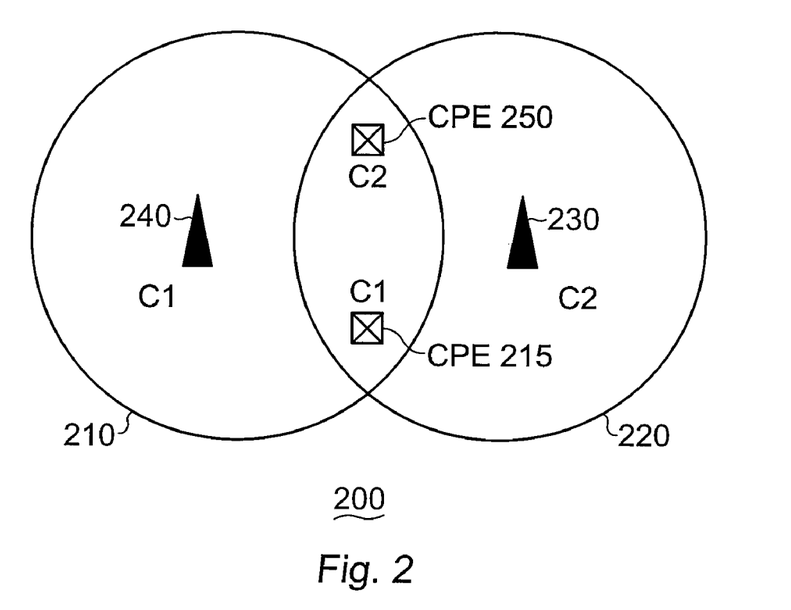
FIG. 2 shows a high level view of two overlapping WRAN cells operating on different working channels as well as two CPEs within the overlap area of the two WRAN cells operating on a common control channel according to one embodiment of the present invention.

FIG. 2 shows a high level view 200 of two overlapping WRAN cells 210, 220 operating on different working channels utilizing a common control channel within the overlap area defined by their coverage intersection. As in the prior art, each WRAN cell 210, 220 is associated with a BS 240, 230. Each WRAN cell 210, 220 operates initially on a different working channel. While the cells may together utilize DFH to eliminate quiet time, the control channel for the purposes of conveying information among the BS of the control channel owner CPE and the CPEs associated with different BSs in the overlapping area is unique.

Unlike the prior art, the CPEs 215 shown in FIG. 1 operate on the same control channel regardless of which BS they were originally associated. According to one embodiment of the present invention, an ECBP message is communicated among the BSs and CPEs associated with the common control channel in the overlap area 250. Unlike a normal CBP message, the ECBP message includes additional information necessary for common control channel usage. When a CPE in an overlap area 250 receives an ECBP message from its associated BS using its working channel, it will forward using the common control channel the received ECBP messages to the CPEs associated with other BSs and to the BS associated with the common control channel owner CPE in the same overlap area. When a CPE in an overlap area receives ECBP messages from the CPEs associated with other BSs or the BS associated with the common control channel in the same overlap area using the common control channel, it will forward the ECBP messages to the BS that it associates with using its working channel.

The ECBP packet shall include fields of the CBP packet but also includes the following new fields: Former common control channel ID, Current common control channel ID, BS ID of the common control channel owner, Current working channel ID, Synchronization type (i.e. being synchronized by a GPS receiver, being synchronized by another cell with GPS receiver, being synchronized without GPS timing information), GPS time (if synchronized by GPS time). Other related fields may also be included.

According to one embodiment of the present invention, the presence of another working channel within a particular region triggers the BS to initiate a common control channel selection protocol. This protocol may also be executed by CPEs to the extent the CPE may select a particular common control channel on which to operate.

From the sensed working channels, the BS selects a single channel that will be used to provide ECBP packets to all of the CPEs within the overlap area. When the common control channel is also the working channel for one of the WRAN cells, all of the CPEs within that cell continue to operate using that working channel. However, for CPEs that are operating on a neighboring WRAN cell working channel, and wherein that working channel does not meet the common control channel selection criteria, those CPEs switch to the common control channel when operating in an overlapping area.

CPEs determine whether they are in an overlap area 150 by continually sensing for other working channels. When no other working channel is found, the CPEs operate on the working channel associated with the BS. However, when other working channels are sensed, the CPEs recognize that they are within an overlap area of at least two WRAN cells and thus must determine upon what working channel they must operate.

The selection criteria for the common control channel can be determined by the channel having the lowest frequency, the channel having the highest frequency, or some other predetermined criteria. Furthermore, when a WRAN joins a community or one exits a community, the number of overlap areas and working channels may change resulting in a new common control channel for one or more overlap areas.

Figure 3:
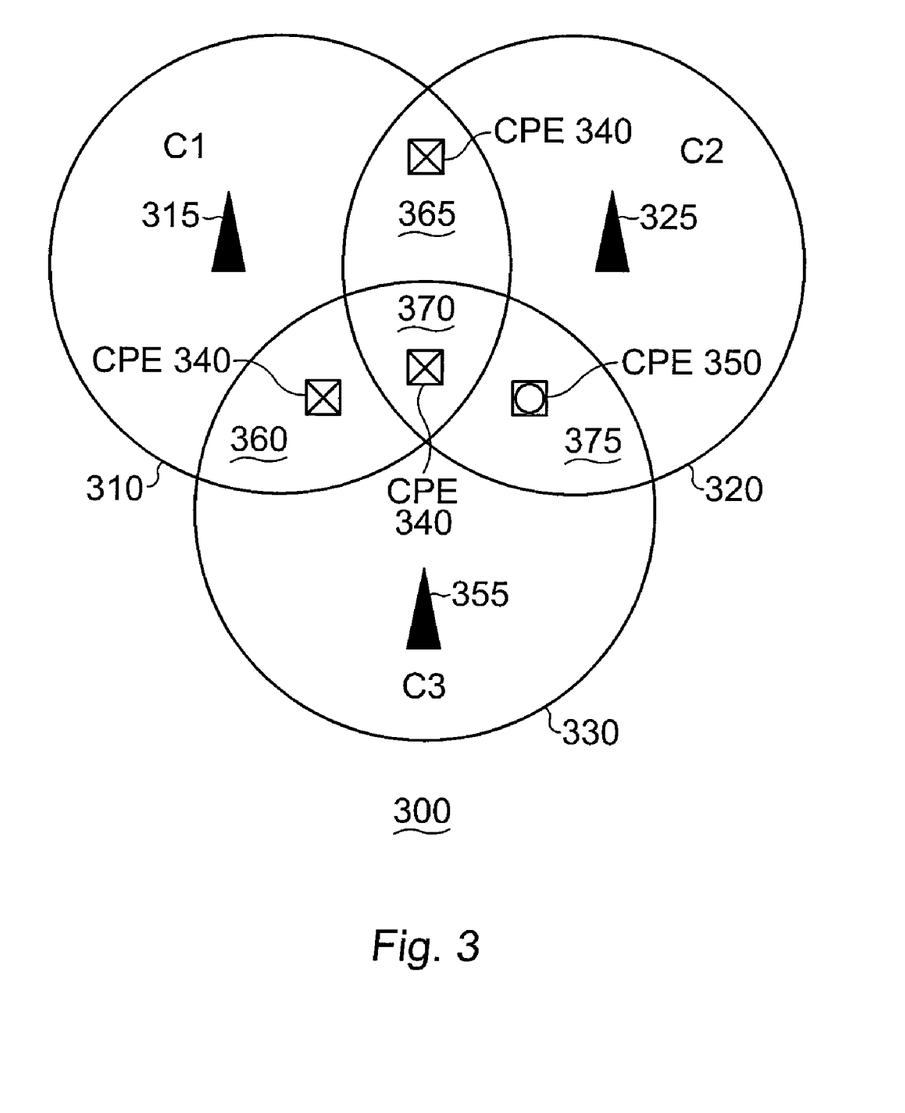
FIG. 3 shows a high level view of three overlapping WRAN cells operating on different working channels creating four separate overlap areas that include a plurality of CPEs operating on a common control channel according to one embodiment of the present invention.

Each overlap area has a unique common control channel. According to one embodiment of the present invention, and as shown in FIG. 3, the common control channel may vary from one overlap area to another. FIG. 3 shows a high level depiction of a community 300 of three overlapping WRAN cells 310, 320, 330 forming four different overlap areas 360, 365, 370, 375. Each WRAN cell is associated with a BS 315, 325, 335 and a plurality of CPEs 340, 350. Each BS operates on a different working channel yet the CPEs operating within each of the overlap areas, according to one embodiment of the present invention, operate on a selected common control channel.

In the example depicted in FIG. 3, there are three WRAN cells 310, 320, 330 for four different overlap areas 360, 365, 370, 375. Assume that the first WRAN cell 310 operates on a working channel C1, the second WRAN cell 320 operates on a working channel C2, and the third WRAN 330 operates on a working channel C3, Further assume for the purposes of this example that the common control channel selection criteria or protocol is such that it directs the common control channel to be of the lowest frequency possible, C1 having a frequency lower than that of C2 or C3, respectively.

In three of the overlap areas 360, 365, 370, C1 is one of the working channels that would be sensed by the CPEs operating in those areas. Only in the far right most overlap area, the one formed by the intersection of WRAN cell 320 and WRAN cell 330, would C1 not be present. Thus for three of the four overlap areas, C1 would be identified and selected as the common control channel. In the last overlap area 375, the selection is between C2 and C3. The criteria in place for this example would make C2 the common control channel.

After the common control channel is found for the CPEs in each overlapping area, all the ECBP packets are transmitted on the common control channel for that particular area. This enables control information communication and synchronization among the overlapping cells working in different channels much like control information communication and synchronization among the overlapping cells working on the same channel.

After a BS receives ECBP packets in the common control channel(s) from their neighboring cells, the BS can use a synchronization algorithm to synchronize the cells' frames. The present invention supports synchronization by Global Positioning System ("GPS") receivers as well as the synchronization of cells that either do not include the needed hardware for GPS synchronization, or are installed in such a way that the satellite visibility is limited or obstructed.

To synchronize the cells that can not receive GPS signal clearly, the cells that are synchronized by a GPS receiver or synchronized by another cell with a GPS receiver send time information using ECBP packets to those neighbor cells incapable of receiving GPS signal. When the cells that can not receive GPS signal receive this time information from the neighboring cells being synchronized by GPS receivers, they synchronize their time to the received GPS time. Otherwise, when the cells that can not receive GPS signal receive the time information from a neighboring cells being synchronized by another cell with a GPS receiver, they synchronize their time to the received GPS time. When the GPS time is acquired, the frame is synchronized to a specific time point of the GPS time baseline.

If a group of WRAN cells or a community of cells have no neighboring cells that are synchronized by a GPS receiver or are synchronized by another cell with a GPS receiver, these cells use a synchronization algorithm known in the prior art to synchronize their frames after receiving ECBP packets in the common control channels from their neighboring cells.

As previously indicated, the criteria for common control channel selection may vary according to the needs of the wireless network. According to one embodiment of the present invention, the lowest numbered working channel, i.e. the channel operating on the lowest frequency, is selected as the common working channel for a particular overlap area.

According to one embodiment of the present invention, this selection process may change as WRAN cells are removed from service or a community adds a new WRAN cell member.

Using the assumption that the smallest channel is the preferable common control channel, when a BS selects a new smallest working channel that is smaller than the original smallest working channel, a CPE that associates with that BS in the overlapping area may have the smallest working channel in the corresponding overlap area. When this is the case, the CPE may transmit ECBP packets to the surrounding CPEs and BSs that indicate that it is the owner of the new common control channel and include the new common control channel identification data. These ECBP packets may be transmitted in the original common control channel to help the neighboring CPEs of the CPE owning the new common control channel to switch to the new common control channel.

After a BS selects a new smallest working channel that is smaller than the original smallest working channel, a CPE that associates with the original common control channel and its BS is the common control channel owner in the overlap area may no longer be the common control channel owner in the corresponding overlapping area. When this is the case, the CPE may transmit ECBP packets that indicate that its BS is no longer the common control channel owner. Again these ECBP packets may be transmitted in the original common control channel to help neighboring CPEs to select a new common control channel.

After a BS finds the common control channel for a CPE with which it previously associated, the BS notifies that CPE about its new common control channel. The CPEs now associated with the common control channel shall then transmit their ECBP packets in the common control channel(s) using a back-off procedure.

According to one embodiment of the present invention, CPEs continuously monitor working channels to determine whether a new common control channel should be selected. This may occur as the CPE moves from one overlap area to the next. Furthermore, when the common control channel is lost by the CPE, a new common control channel is selected using the original criteria.

Figure 4:
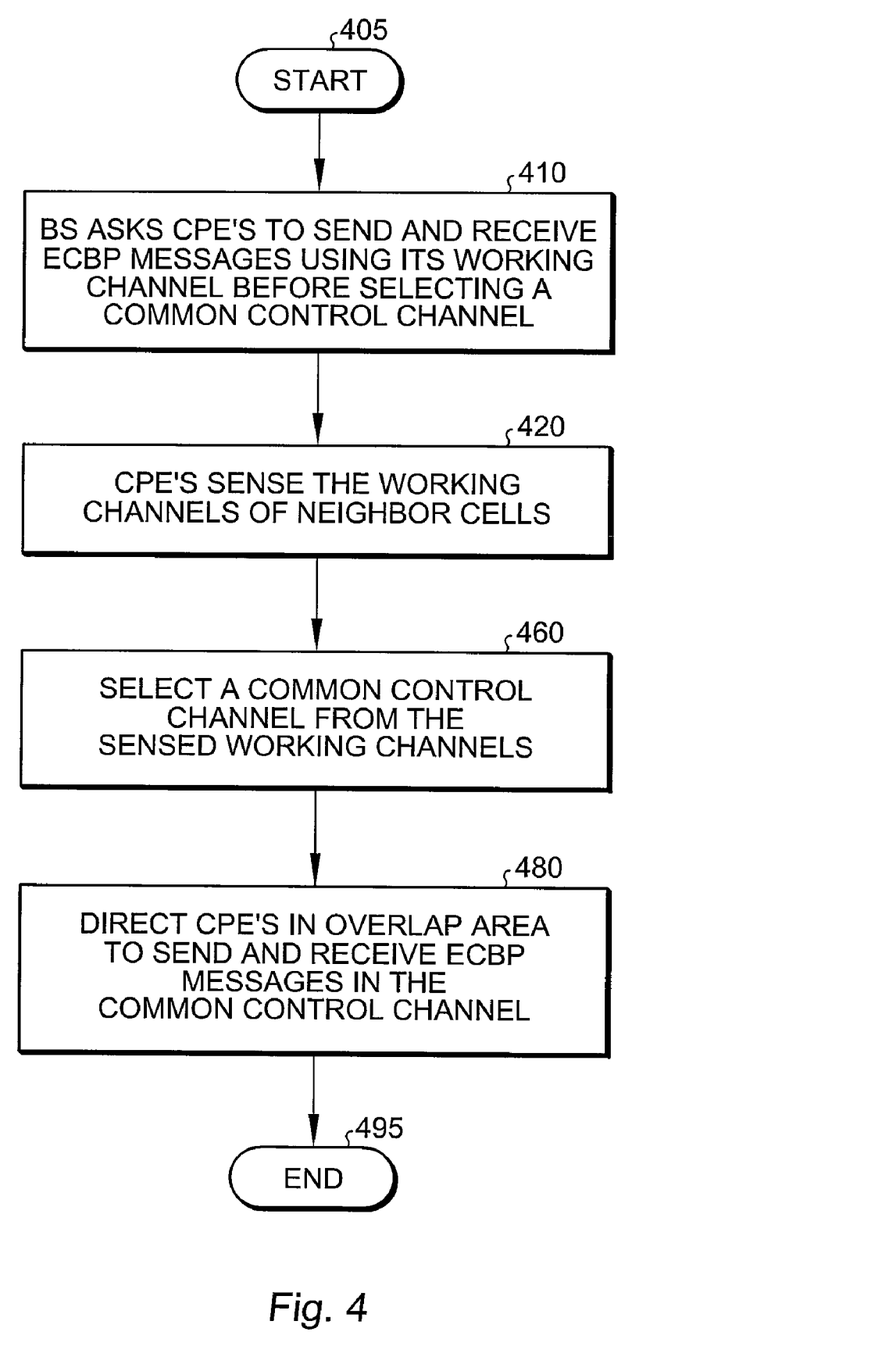
FIG. 4 shows a high level flowchart for a method to select and operate on a common control channel for CPEs operating in overlap areas formed by a plurality of WRAN cells operating on different working channels.

FIG. 4 is a high level flowchart of a method for selecting a common control channel in overlap areas formed by a plurality of WRAN cells operating on different working channels according to one embodiment of the present invention. The process begins 405 with the establishment 410 of ECBP messages between CPEs and BSs. Before selecting a common control channel, a BS 410 will request its CPEs forward its ECBP messages in its working channels. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As previously discussed, the ECBP messages transmitted among the CPEs in the overlap area and the BS of the common control channel owner are transmitted on the common control channel. This is determined by CPEs sensing 420 working channels used by other BSs different from the working channel it is currently using. Once recognizing an overlap exists, the CPEs and/or BS select 460 a common control channel from among the channels sensed in the overlap area. Note that one BS may have several overlap areas based on interactions with several different WRAN cells.

With a common control channel selected 460, the process ends 495 with all CPEs within the overlap area being directed 480 via ECBP packets to send and receive synchronization data on the common control channel. Thereafter the CPEs and BSs continuously monitor and sense the presence of new working channels so as to revisit the need to identify a new common control channel.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects be they associated with CPEs or BSs are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment.

While there have been described above the principles of the present invention in conjunction with synchronization of overlapping cells with different operating channels, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for communication in overlap areas formed by a plurality of overlapping wireless regional area network ("WRAN") cells wherein each WRAN cell is operating on a different channel and wherein each WRAN is associated with a base station ("BS") and a plurality of consumer premise equipments ("CPEs"), the method comprising:
transmitting, between at least one CPE and a BS within at least one WRAN cell in the plurality of overlapping WRAN cells, an enhanced coexistence beacon protocol ("ECBP") packet on the at least one WRAN cell's working channel;
sensing working channels used by other WRAN cells of the plurality of overlapping WRAN cells;
selecting a common control channel for an overlap area formed by the plurality of overlapping WRAN cells; and
transmitting ECBP packets on the common control channel,
wherein each ECBP packet includes the following fields: former common control channel ID, current common control channel ID, BS ID of the common control channel owner, current working channel ID, and synchronization type.

2. The method of claim 1 wherein the ECBP packets include common control channel data.

3. The method of claim 1 wherein the common control channel is selected from a working channel of at least one of the plurality of overlapping WRAN cells forming the overlap area.

4. The method of claim 1 wherein sensing includes energy detection to identify whether any sensed channel is associated with a user.

5. The method of claim 1 wherein sensing includes detecting a channel user type.

6. The method of claim 1 wherein the common control channel is selected for use by each CPE.

7. The method of claim 1 wherein selecting includes identifying a smallest common control channel.

8. The method of claim 1 further comprising synchronizing frames among the plurality of overlapping WRAN cells responsive to receiving ECBP packets on the common control channel from neighboring WRAN cells.

9. The method of claim 1 wherein synchronizing includes multiple channel synchronization.

10. The method of claim 1 wherein WRAN cell synchronize time information is based on received ECBP packets.

11. The method of claim 1 wherein ECBP packets include global positioning system time information.

12. A system for common control channel communication in a plurality of wireless regional area network ("WRAN") cells wherein each WRAN is associated with a base station ("BS") and a plurality of consumer premise equipments ("CPEs"), the system comprising:
a plurality of overlap areas formed by overlapping the plurality of WRAN cells;
an enhanced coexistence beacon protocol ("ECBP") packet transmitted on a working channel of at least one of the plurality of WRAN cells;
at least one CPE of the plurality of CPEs operating in one of the plurality of overlap areas configured to sense channels being used by neighboring WRAN cells; and
a common control channel for the plurality of overlap areas wherein the common control channel is selected based on sensed channels and used to convey ECBP packets in each of the plurality of overlap areas,
wherein each ECBP packet includes the following fields: former common control channel ID, current common control channel ID, BS ID of the common control channel owner, current working channel ID, and synchronization type.

13. The system of claim 12 wherein the common control channel is the working channel of at least one of the plurality of WRAN cells.

14. The system of claim 12 wherein the ECBP packets include common control channel data.

15. The method of claim 12 wherein the common control channel is selected for use by each CPE.

16. The system of claim 12 wherein selecting includes identifying a smallest common control channel.

17. The system of claim 12 wherein responsive to receiving ECBP packets on the common control channel from neighboring WRAN cells, frames among the plurality of overlapping WRAN cells are synchronized.

18. The system of claim 17 wherein the common control channel enables multiple channel synchronization.

19. The system of claim 12 wherein ECBP packets includes WRAN cell synchronize time information.

20. The system of claim 12 wherein ECBP packets include global positioning system time information.

21. The system of claim 12 wherein the common control channel is selected by a dynamic frequency hopping community leader.

22. The system of claim 21 wherein the common control channel carries ECBP messages that include dynamic frequency hopping community management messages.

23. A non-transitory computer readable medium encoding an enhanced coexistence beacon protocol ("ECBP") packet, wherein the ECBP packet comprises:
a former common control channel ID;
a current common control channel ID;
a base station ("BS") ID of a common control channel owner;
a current working channel ID;
a synchronization type.

24. The non-transitory computer readable medium of claim 23, wherein the ECBP packet further comprises a GPS time.

25. A base station ("BS") or consumer premise equipments ("CPE") comprising the non-transitory computer readable medium of claim 23.

26. A method for communication for a consumer premise equipment ("CPE") in overlap areas formed by a plurality of overlapping wireless regional area network ("WRAN") cells wherein each WRAN cell is operating on a different channel and wherein each WRAN is associated with a base station ("BS") and a plurality of CPEs, the method comprising:
- sending and receiving an enhanced coexistence beacon protocol ("ECBP") packet on a working channel at the request of a base station associated with a WRAN cell of the plurality of overlapping WRAN cells, wherein the working channel is an operating channel of the WRAN cell;
- sensing working channels used by other WRAN cells of the plurality of overlapping WRAN cells;
- selecting a common control channel for an overlap area formed by the plurality of overlapping WRAN cells; and
- sending and receiving ECBP packets on the common control channel, wherein each ECBP packet includes the following fields: former common control channel ID, current common control channel ID, BS ID of the common control channel owner, current working channel ID, and synchronization type.

27. The method of claim 26, further comprising continuously monitoring and sensing for the presence of new working channels and revisit selecting a new common control channel and sending and receiving on the new common control channel.

28. A CPE implementing the method of claim 26.

* * * * *